(12) United States Patent
Bradbury et al.

(10) Patent No.: US 11,829,495 B2
(45) Date of Patent: Nov. 28, 2023

(54) CONFIDENTIAL DATA PROVIDED TO A SECURE GUEST VIA METADATA

(71) Applicant: INTERNATIONAL BUSINESS MACHINES CORPORATION, Armonk, NY (US)

(72) Inventors: Jonathan D. Bradbury, Poughkeepsie, NY (US); Reinhard Theodor Buendgen, Baden-Wuerttemberg (DE); Janosch Andreas Frank, Stuttgart (DE); Marc Hartmayer, Haigerloch-Bittelbronn (DE); Viktor Mihajlovski, Wildberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 146 days.

(21) Appl. No.: 17/394,963

(22) Filed: Aug. 5, 2021

(65) Prior Publication Data
US 2023/0043503 A1 Feb. 9, 2023

(51) Int. Cl.
*G06F 21/62* (2013.01)
*G06F 9/455* (2018.01)
(Continued)

(52) U.S. Cl.
CPC .......... *G06F 21/62* (2013.01); *G06F 9/45558* (2013.01); *G06F 21/64* (2013.01);
(Continued)

(58) Field of Classification Search
CPC ...... G06F 21/62; G06F 21/64; G06F 21/6218; G06F 21/74; G06F 21/53; G06F 9/45558;
(Continued)

(56) References Cited

U.S. PATENT DOCUMENTS 10,303,899 B2 5/2019 Durham et al.
10,516,990 B2 12/2019 Wane
(Continued)

FOREIGN PATENT DOCUMENTS

CN 111095899 A 5/2020
TW 201740269 A 11/2017
(Continued)

OTHER PUBLICATIONS

Notification of Transmittal of the International Search Report and the Written Opinion of the International Searching Authority, PCT/EP2022/071772, dated Nov. 24, 2022, 12 pages.
(Continued)

*Primary Examiner* — Han Yang
(74) *Attorney, Agent, or Firm* — Edward J. Wixted, III, Esq.; Blanche E. Schiller, Esq.; Heslin Rothenberg Farley & Mesiti P.C.

(57) ABSTRACT

A secure guest of a computing environment requests confidential data. The confidential data is included in metadata of the secure guest, which is stored in a trusted execution environment of the computing environment. Based on the request, the confidential data is obtained from the metadata of the secure guest that is stored in the trusted execution environment.

25 Claims, 9 Drawing Sheets

(51) Int. Cl.
    *G06F 21/64* (2013.01)
    *H04L 9/08* (2006.01)
    *H04L 9/40* (2022.01)

(52) U.S. Cl.
    CPC ............ *H04L 9/088* (2013.01); *H04L 9/0861* (2013.01); *H04L 63/04* (2013.01); *G06F 2009/45575* (2013.01); *G06F 2009/45587* (2013.01)

(58) Field of Classification Search
    CPC . G06F 2009/45575; G06F 2009/45587; H04L 9/0861; H04L 9/088; H04L 63/04
    See application file for complete search history.

(56) References Cited

U.S. PATENT DOCUMENTS

| | | | |
|---|---|---|---|
| 10,628,612 | B2 | 4/2020 | Durham et al. |
| 10,671,737 | B2 | 6/2020 | Durham et al. |
| 10,699,006 | B1* | 6/2020 | Wei .......................... G06F 21/53 |
| 10,977,362 | B2 | 4/2021 | Yu et al. |
| 2005/0210467 | A1* | 9/2005 | Zimmer .............. G06F 9/45558 718/1 |
| 2008/0244569 | A1 | 10/2008 | Challener et al. |
| 2009/0172328 | A1 | 7/2009 | Sahita et al. |
| 2013/0097296 | A1* | 4/2013 | Gehrmann ............ G06F 9/4856 709/223 |
| 2017/0323098 | A1 | 11/2017 | Denier |
| 2018/0331824 | A1* | 11/2018 | Racz .......................... H04L 9/30 |
| 2020/0285746 | A1 | 9/2020 | Buendgen et al. |
| 2020/0285748 | A1 | 9/2020 | Buendgen et al. |
| 2020/0326972 | A1 | 10/2020 | Doane et al. |
| 2021/0103629 | A1* | 4/2021 | Kiryu .................. G06F 21/6245 |
| 2022/0020000 | A1 | 1/2022 | Wilson |
| 2023/0037746 | A1* | 2/2023 | Buendgen ........... G06F 9/45545 |
| 2023/0039894 | A1* | 2/2023 | Imbrenda .............. G06F 9/5077 |
| 2023/0040577 | A1* | 2/2023 | Buendgen ............. H04L 9/3271 |
| 2023/0044731 | A1* | 2/2023 | Buendgen ........... G06F 9/45558 |

FOREIGN PATENT DOCUMENTS

| | | |
|---|---|---|
| TW | 202036345 A | 10/2020 |
| TW | 202105226 A | 2/2021 |
| WO | WO2019120328 A2 | 6/2019 |

OTHER PUBLICATIONS

Notification of Transmittal of the International Search Report and the Written Opinion of the International Searching Authority, PCT/EP2022/071763, dated Nov. 21, 2022, 10 pages.

IBM, "z/Architecture—Principles of Operation," IBM Publication No. SA22-7832-12, Thirteenth Edition, Sep. 2019, pp. 1-2000.

Mell, Peter and Tim Grance, "The NIST Definition of Cloud Computing," National Institute of Standards and Technology, Information Technology Laboratory, Special Publication 800-145, Sep. 2011, pp. 1-7.

Citrix, "Security Recommendations When Deploying Citrix XenServer," 2016 (No Further Date Information Available), pp. 1-68.

Anonymous, "Protecting Secrets In Docker Environments," IP.com No. IPCOM000262988D, Jul. 20, 2020, pp. 1-5 (+ cover).

Anonymous, "Secure Computation Architecture for Client-Side Encryption," IP.com No. IPCOM000263004D, Jul. 21, 2020, pp. 1-5 (+ cover).

Anonymous, "Fully Decentralized Cloud Using Generalized Trusted Execution Environments and Distributed Hash Tables (Without Blockchain)," IP.com No. IPCOM000264923D, Feb. 5, 2021, pp. 1-6 (+ cover).

Hoffman, Owen S. et al., "InkTag: Secure Applications On An Untrusted Operating System," Mar. 2013, pp. 1-14.

Slay, Jill, "Enhancing Trust," 4th Australian Information Warfare & IT Security Conference, University of South Australia, Nov. 2003, pp. 1-426 (+ cover and Contents).

Buendgen, Reinhard Theodor et al., "Customization of Multi-Part Metadata Of A Secure Guest," U.S. Appl. No. 17/395,006, filed Aug. 5, 2021, pp. 1-54.

List of IBM Patents or Patent Applications Treated As Related, Aug. 10, 2021, 2 pages.

* cited by examiner

METADATA DATA STRUCTURE

| CONFIDENTIAL DATA | IDENTIFIER | INDICATOR |
|---|---|---|
| 304 | 306 | 308 |
| . | . | . |
| . | . | . |
| . | . | . |
|  |  |  |

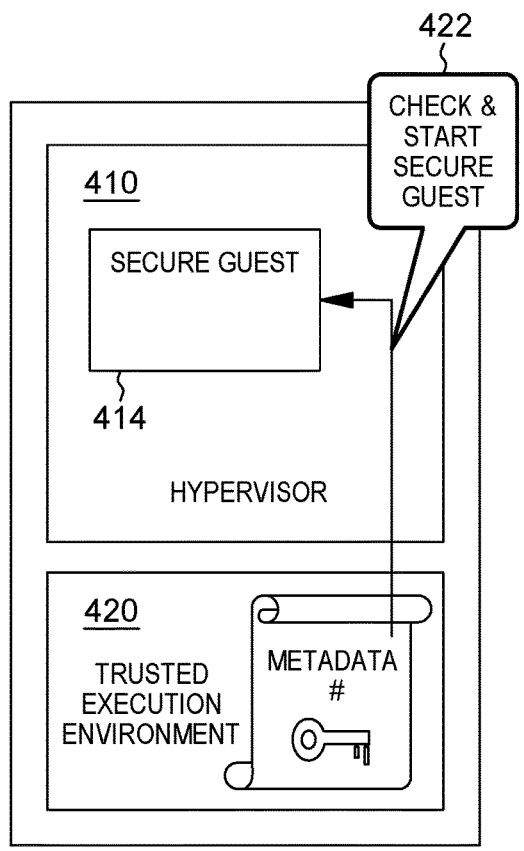 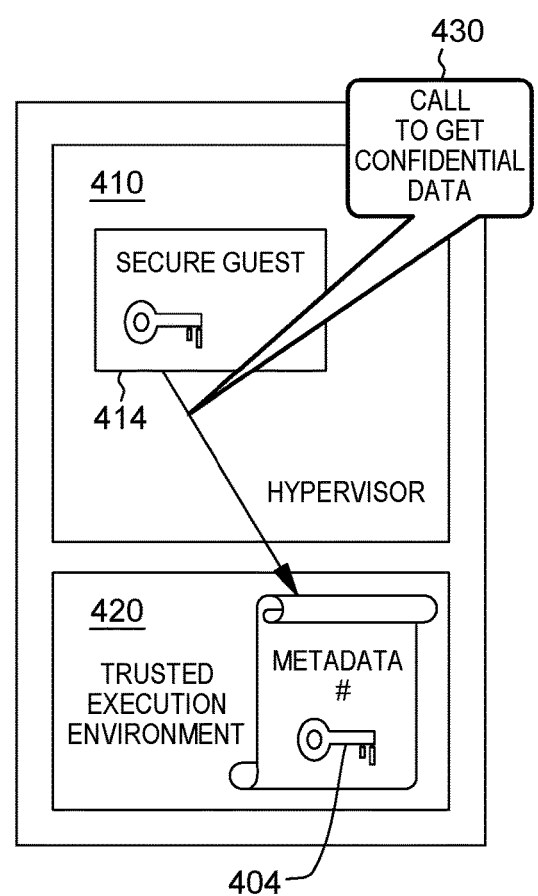
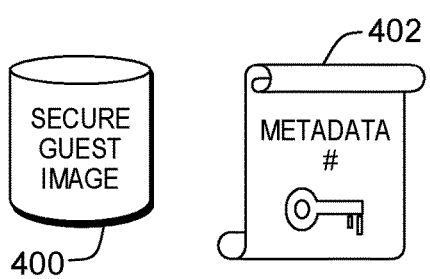 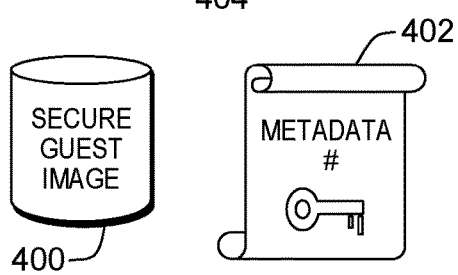
FIG. 4C FIG. 4D

THE CONFIDENTIAL DATA INCLUDES A KEY TO BE USED IN CRYPTOGRAPHIC OPERATIONS — 520

BASED ON THE REQUESTING AND BASED ON AN INDICATION THAT A PLAIN TEXT VALUE OF THE KEY IS NOT TO BE PROVIDED TO THE SECURE GUEST, A PROTECTED KEY OBJECT DERIVED FROM THE KEY IS OBTAINED BY THE SECURE GUEST — 522

THE PROTECTED KEY OBJECT IS RESTRICTED FOR USE BY A CALLING INSTANCE OF THE SECURE GUEST AND IS ABSENT THE PLAIN TEXT VALUE OF THE KEY — 524

THE INDICATION IS INCLUDED IN A DATA STRUCTURE ACCESSIBLE TO THE TRUSTED EXECUTION ENVIRONMENT CONFIGURED TO PROVIDE THE CONFIDENTIAL DATA TO THE SECURE GUEST — 526

USING THE CONFIDENTIAL DATA BY THE SECURE GUEST TO ESTABLISH A SECURE COMMUNICATION WITH AN ENTITY EXTERNAL TO THE COMPUTING ENVIRONMENT — 528

THE METADATA IS INTEGRITY PROTECTED HAVING ONE OR MORE INTEGRITY MEASURES FOR AN IMAGE OF THE SECURE GUEST AND INCLUDES THE CONFIDENTIAL DATA IN AN ENCRYPTED PORTION OF THE METADATA THAT IS EXCLUSIVELY DECRYPTED BY THE TRUSTED EXECUTION ENVIRONMENT — 530

FIG. 5B

CONFIDENTIAL DATA PROVIDED TO A SECURE GUEST VIA METADATA

BACKGROUND

One or more aspects relate, in general, to facilitating processing within a computing environment, and in particular, to improving such processing.

A computing environment may support virtualization, in which a hypervisor or virtual machine manager of the computing environment hosts various guests, such as virtual machines or virtual servers of the computing environment. A virtual machine has access to system resources and may execute an operating system, such as a guest operating system. Different guests can be owned by different owners, and of these guests, some can be secure guests.

A traditional hypervisor has full control over the hosted guests. In particular, the hypervisor has the capability to inspect and even modify memory of the hosted guest. However, a secure guest is a guest that can be hosted by hypervisors that are not fully trustworthy. The image of such a secure guest would be protected when loaded and the protection of the contents of the resources assigned to the guest (e.g., memory, CPU registers) would be maintained throughout the lifetime of the guest. The protection of the guest includes at least integrity protection (e.g., hypervisor cannot maliciously change any guest states) and in addition can include maintaining the confidentiality of the initial image, code and data running in the secure guest.

Secure guests may wish to have access to confidential data of the secure guests. Processing used to provide such confidential data to the secure guests is to be facilitated.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes requesting by a secure guest of the computing environment confidential data. The confidential data is included in metadata of the secure guest. The metadata is stored in a trusted execution environment of the computing environment. Based on the requesting, the confidential data is obtained from the metadata of the secure guest stored in the trusted execution environment. This provides to the secure guest the confidential data in an efficient manner, improving system performance.

In one example, the requesting includes a call function to the trusted execution environment to request the confidential data. As an example, the call function is non-interceptable.

In one aspect, the confidential data has an identifier associated therewith.

Further, in one example, the requesting includes a call function to the trusted execution environment to request the confidential data, and the call function includes the identifier of the confidential data. The identifier is used to return the confidential data associated with the identifier to the secure guest. The use of the identifier facilitates the providing of the confidential data associated with the identifier, allowing to store multiple items of confidential data in the metadata of a secure guest and accessing specific items of confidential data, and ensuring protection.

In one example, the confidential data includes a key to be used in cryptographic operations. As an example, based on the requesting and based on an indication that a plain text value of the key is not to be provided to the secure guest, a protected key object derived from the key is obtained by the secure guest. The protected key object is restricted for use by a calling instance of the secure guest and absent the plain text value of the key.

The trusted execution environment can convert the key into a protected key object that does not include the plain text value of the key and is enabled for use in the computing environment by the calling instance of the secure guest only. If the secure guest requests a confidential datum of type key from the trusted execution environment, the trusted execution environment returns a protected key object that can be used by the secure guest in cryptographic operations of the computing environment. This allows the secure guest to obtain and use a key of which the plain text value is not disclosed outside of the trusted firmware of the computing environment.

In one example, the indication is included in a data structure accessible to the trusted execution environment configured to provide the confidential data to the secure guest.

As an example, the confidential data is used by the secure guest to establish a secure communication with an entity external to the computing environment. This facilitates communication, improving processing associated therewith.

In one example, the metadata is integrity protected having one or more integrity measures for an image of the secure guest and includes the confidential data in an encrypted portion of the metadata that is exclusively decrypted by the trusted execution environment. This protects the confidential data in that, in one embodiment, only the trusted execution environment can decrypt the metadata.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 4A-4D depict one example of a process to insert confidential data in a secure guest, in accordance with one or more aspects of the present invention;

FIGS. 5A-5B depict one example of facilitating processing within a computing environment, in accordance with one or more aspects of the present invention;

DETAILED DESCRIPTION

In accordance with one or more aspects of the present invention, a capability is provided to facilitate processing within a computing environment. As an example, the capability includes providing confidential data (a.k.a., a secret) to a secure guest of the computing environment subsequent to the secure guest being loaded. In one example, the confidential data is provided, e.g., absent a changing or reloading of an image of the secure guest and without knowing a specific location in which the confidential data is to be placed (e.g., without knowing a specific location in memory of the secure guest in which the data is to be placed). As an example, the confidential data is included in metadata of the secure guest, and the metadata is loaded into a trusted execution environment. Based on a request for the confidential data, the confidential data is retrieved from the trusted execution environment and placed in the secure guest. In one example, a plain text representation of the confidential data is provided to the secure guest. In another example, an encrypted representation of the confidential data is provided.

One embodiment of a computing environment to incorporate and use one or more aspects of the present invention is described with reference to FIG. 1. As an example, the computing environment is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Figure 1:
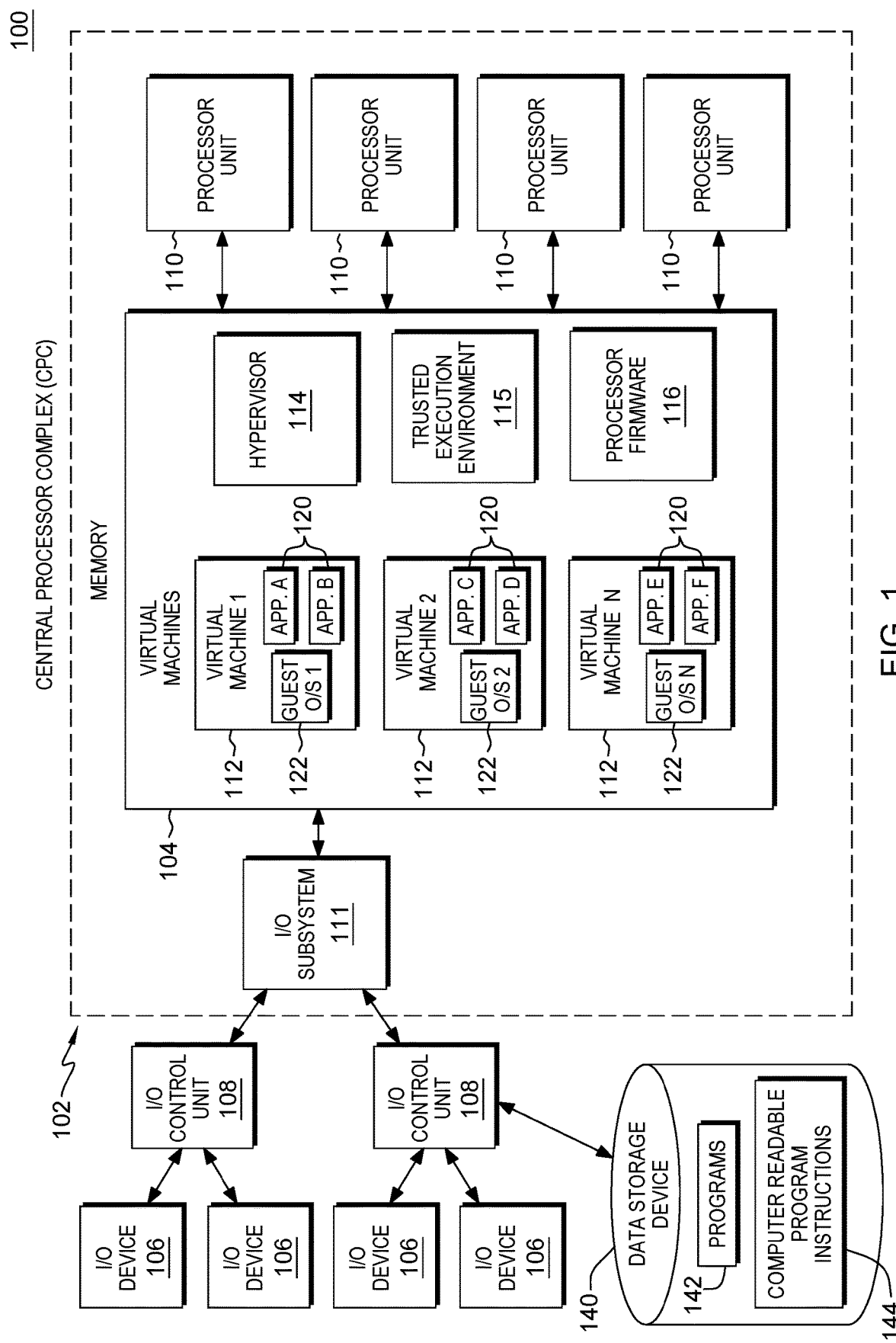
FIG. 1 depicts one example of a computing environment to incorporate and use one or more aspects of the present invention.

Referring to FIG. 1, in one example, a computing environment 100 includes a central processor complex (CPC) 102. Central processor complex 102 is, for instance, an IBM Z® server (or other server or machine offered by International Business Machines Corporation or other entities) and includes a plurality of components, such as, for instance, a memory 104 (a.k.a., system memory, main memory, main storage, central storage, storage) coupled to one or more processor units (also referred to as processors) 110 and to an input/output (I/O) subsystem 111. Example processor units 110 include one or more general-purpose processors (a.k.a., central processors or central processing units (CPUs)) and/or one or more other processors. IBM Z is a trademark or registered trademark of International Business Machines Corporation in at least one jurisdiction.

I/O subsystem 111 can be a part of the central processor complex or separate therefrom. It directs the flow of information between main storage 104 and input/output control units 108 and input/output (I/O) devices 106 coupled to the central processor complex.

Many types of I/O devices may be used. One particular type is a data storage device 140. Data storage device 140 can store one or more programs 142, one or more computer readable program instructions 144, and/or data, etc. The computer readable program instructions can be configured to carry out functions of embodiments of aspects of the invention.

Central processor complex 102 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 102. Examples include, but are not limited to: microcode or millicode, device drivers, redundant processing units, external disk drive arrays, RAID systems, tape drives, and data archival storage systems, etc.

Further, central processor complex 102 can be operational with numerous other general-purpose or special-purpose computing system environments or configurations. Examples of well-known computing systems, environments, and/or configurations that may be suitable for use with central processor complex 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Central processor complex 102 provides, in one or more embodiments, virtualization support, in which memory 104 includes, for example, one or more virtual machines 112 (also referred to as guests), a virtual machine manager, such as a hypervisor 114, that manages the virtual machines, a trusted execution environment 115 (also referred to as an ultravisor) and processor firmware 116. One example of hypervisor 114 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

In one or more embodiments, trusted execution environment 115 may be implemented, at least in part, in hardware and/or firmware configured to perform, for instance, processes such as described herein. The trusted execution environment is trusted firmware and/or hardware that makes use of memory-protection hardware to enforce memory protection. The owner of a guest can securely pass information (using, e.g., IBM Secure Execution) to the trusted execution environment by using a public host key, which is embedded in a host key document. To process the confidential information, the trusted execution environment uses a matching private host key. The private host key is specific to the server, e.g., the IBM Z® server, and is hardware protected.

Processor firmware 116 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

The virtual machine support of the central processor complex provides the ability to operate large numbers of virtual machines 112, each capable of operating with different programs 120 and running a guest operating system 122, such as the Linux® operating system. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figures 2, 3:
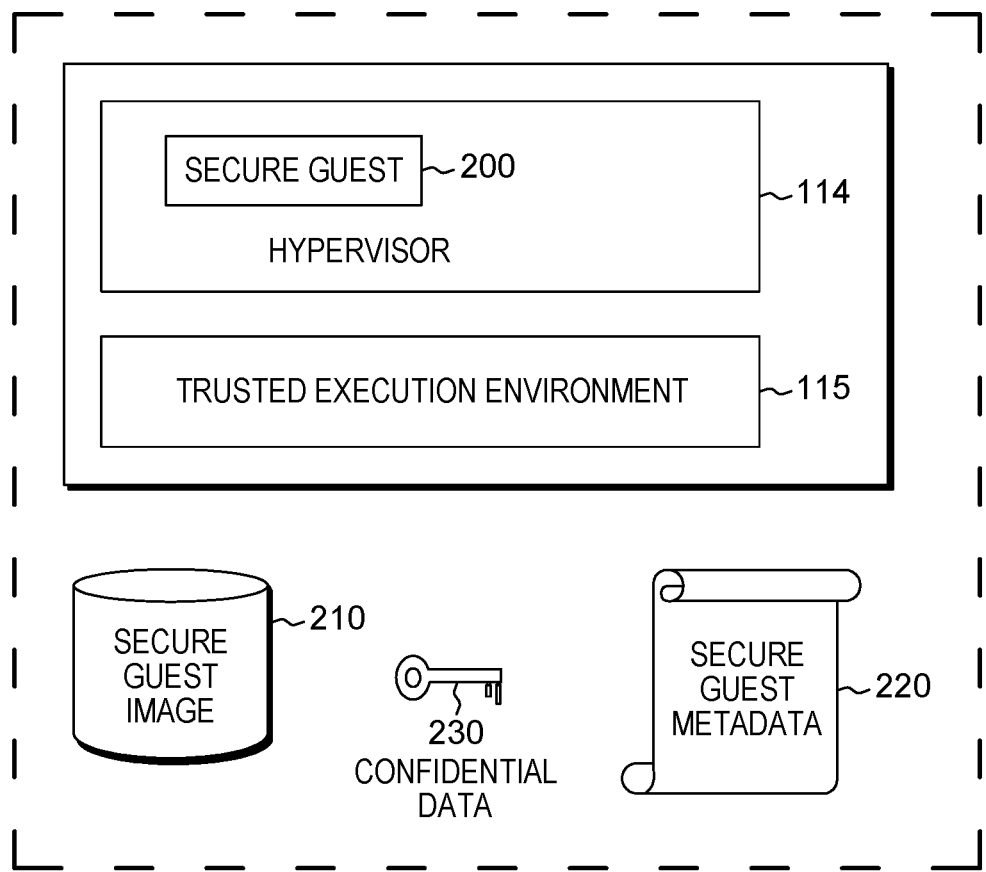
FIG. 2 depicts one example of confidential data to be included in a secure guest, in accordance with one or more aspects of the present invention.
FIG. 3 depicts one example of a metadata data structure used in accordance with one or more aspects of the present invention.

In one embodiment, one or more guests 112 are secure guests. Referring to FIG. 2, a secure guest 200 is started by a hypervisor (e.g., hypervisor 114) in a manner that the hypervisor cannot observe the state (e.g., memory, registers, etc.) of the secure guest. For instance, in one embodiment of confidential computing, the hypervisor can start/stop a secure guest, and the hypervisor knows where data used to start the secure guest is located but it cannot look into the running secure guest. Data used to load/start the secure guest may be encrypted in a manner that the hypervisor cannot see the secure guest. The owner of the secure guest image places confidential data in the secure guest metadata and then generates a secure guest image together with the secure guest metadata. After the secure guest is loaded, any interaction with the state of the secure guest is processed by a trusted execution environment, such as trusted execution environment 115.

In one embodiment, to start a secure guest, the hypervisor passes a secure guest image 210 and secure guest metadata 220 to trusted execution environment 115. The metadata is integrity and at least partially confidentially protected and is only interpreted by the trusted execution environment. Based on the information in the secure guest metadata, the trusted execution environment can then enforce the integrity of the secure guest image loaded into memory, protect the memory of the secure guest containing the loaded image from being accessible by the hypervisor and potentially decrypt the secure guest image before starting the secure guest.

In accordance with one or more aspects of the present invention, after the secure guest is loaded, it may be desirable to supply the secure guest with user-specific confidential data 230 (e.g., keys to perform encryption or establish a secure connection, passwords, etc.). In one aspect, the confidential data is included in the secure guest absent reloading or changing the secure guest image that has been loaded. Yet further, the trusted execution environment need not know the memory layout of the secure guest in order to place the confidential data in the secure guest. Further, in one embodiment, this confidential data is supplied to the secure guest in such a manner that the secure guest does not know the plain text value of the confidential data. In another embodiment, the confidential data is returned to the secure guest as plain text data.

In accordance with an aspect of the present invention, the confidentially protected part of the metadata of the secure guest (e.g., secure guest metadata 220) is extended to contain the confidential data (e.g., confidential data 230; e.g., user-specific confidential data that is loadable in the secure guest). In one example, the metadata of the secure guest is extended to contain the confidential data together with one or more identifiers of the confidential data. In yet another example, the metadata of the secure guest is further extended to include an indicator used to indicate whether the confidential data may be returned as a plain text value to the secure guest. Other possibilities also exist.

One embodiment of a data structure used to include a list of (confidential data, identifier, indicator) triples is described with references to FIG. 3. In one example, a metadata data structure 300 is accessible by trusted execution environment 115 and includes, for instance, one or more entries 302. Each entry 302 includes, for instance, confidential data 304, an identifier 306 of the confidential data, and an indicator 308 of whether the confidential data may be returned as a plain text value to the secure guest. This data structure is used, for instance, by the trusted execution environment to provide requested confidential data to the secure guest.

Figures 4A, 4B:
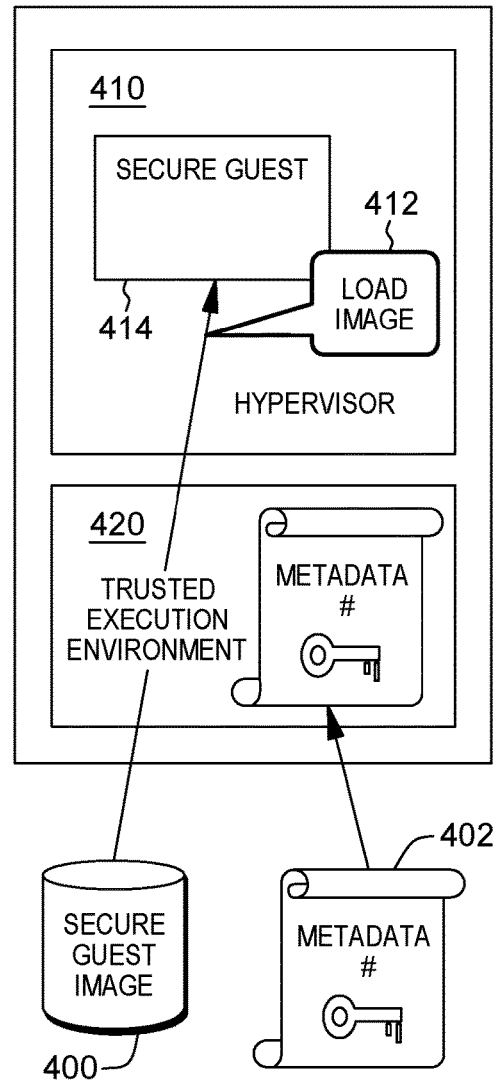

One example of processing used to provide confidential data to a secure guest (e.g., subsequent to loading the secure guest image and/or from a source other than an owner of the guest) is described with reference to FIGS. 4A-4D. As shown in FIG. 4A, a secure guest image 400 and metadata 402 that includes confidential data 404 are available for use in loading the image as a secure guest. In one example, referring to FIG. 4B, hypervisor 410 loads 412 secure guest image 400 into memory of the computing environment to create a secure guest 414. Further, hypervisor 410 loads metadata 402 into a trusted execution environment 420.

Referring to FIG. 4C, trusted execution environment 420 performs, for instance, one or more integrity checks, optionally decrypts the secure guest image and starts 422 secure guest image 402 as secure guest 414.

Further, in accordance with an aspect of the present invention and referring to FIG. 4D, secure guest 414 requests confidential data 404 stored in metadata 402 located in trusted execution environment 420. In one example, the request is performed via a call 430 from secure guest 414 to trusted execution environment 420. The call is, for instance, non-interceptable in that it is directly targeted to the trusted execution environment, and includes, for instance, an identifier of the requested confidential data. In one example, the requested confidential data is data that may be loaded within the secure guest. It is, for instance, a key, a password, etc.

Based on the call, the trusted execution environment, using, e.g., metadata data structure 300, returns a representation of the requested confidential data (e.g., associated with the identifier) from the secure guest metadata (e.g., metadata 402). In one example, the representation is a plain text representation of the confidential data. In another example, the representation is a non-plain text representation (e.g., encrypted) of the confidential data if, for instance, the indicator associated with the identifier indicates that the confidential data may not be returned as a plain text value. For instance, if the confidential data is a key, the trusted execution environment converts the key into a protected key object that does not include the plain text value of the key. That is, if the secure guest requests a confidential datum of type key from the trusted execution environment, the trusted execution environment returns a protected key object usable by the secure guest in, e.g., cryptographic operations. Other examples are possible.

As one specific example representation, if the confidential data is a cryptographic key, then the representation of that key can be an IBM Z® protected key for the secure guest. That is, the key is wrapped (e.g., encrypted) by a wrapping key specific to the secure guest which is hidden in trusted hardware/firmware. In order to provide a plain text key that is usable by the secure guest, the trusted execution environment is to access the wrapping key of the secure guest and use it to unwrap the plain text key before returning the plain text key.

In one example, the call to the trusted execution environment is restricted to be only callable from execution environments running a secure guest. The trusted execution environment enforces that only confidential data from the metadata of the calling secure guest is to be referenced and returned by the trusted execution environment.

As described herein, in one or more aspects, confidential data is to become available to a secure guest that is trusted by the owner of the secure guest. Confidential data of a secure guest may be set or changed without changing or reloading the image of the secure guest. This helps, for instance, if an image of a secure guest is built by some vendor but the secure guest is to run workloads based on confidential data of some customer. In one aspect, the architected location in memory of the secure guest is not needed to place the confidential data in the memory of the secure guest. The trusted execution environment need not know when and where to place the confidential data in the hosted software (i.e., secure guest). Further, in one aspect, bidirectional communication of the confidential data between the trusted execution environment and owner of the secure guest before starting the guest is not needed. The trusted execution environment can start the secure guest based on an image of the secure guest and metadata of the secure guest without interaction with the image owner.

In one or more aspects, the providing of confidential data to one or more secure guests via metadata of the one or more secure guests includes, for instance, securely (e.g., confidentially and integrity protected) communicating metadata of the secure guest to a trusted execution environment. The metadata of the secure guest includes integrity measures (e.g., hash, message authentication code value, cryptographic signature, etc.) of an image of the secure guest to be loaded. The metadata of the secure guest includes confidential data (e.g., optionally with an identifier and/or optionally with a plain text indicator). The trusted execution environment supports a trusted execution environment function that can be called by the secure guest that returns confidential data to the secure guest (e.g., optionally, selected by the identifier and/or optionally provided based on the plain text indicator). The secure guest can use the confidential data (e.g., setup/open encrypted root volumes, keys, passwords, etc.) to establish a secure communication to an external environment. In one example, the confidential data are keys, and the trusted execution environment function returns the keys as protected keys (e.g., keys protected by trusted firmware for which the system provides interfaces to perform cryptographic operations). The function call is, e.g., not interceptable and directly targeted to the trusted execution environment.

One or more aspects of the present invention are inextricably tied to computer technology and facilitate processing within a computer, improving performance thereof. Processing is facilitated by enabling a secure guest access to confidential data (e.g., keys, passwords, etc.) usable in communicating with other entities. Performance is improved by not requiring a reloading or changing of the secure guest image, by not requiring communication with the owner of the guest to provide the confidential data and/or without knowing an exact location (e.g., memory location) for the confidential data to be placed in the secure guest.

Further details of one embodiment of facilitating processing within a computing environment, as it relates to one or more aspects of the present invention, are described with reference to FIGS. 5A-5B.

Figure 5A:
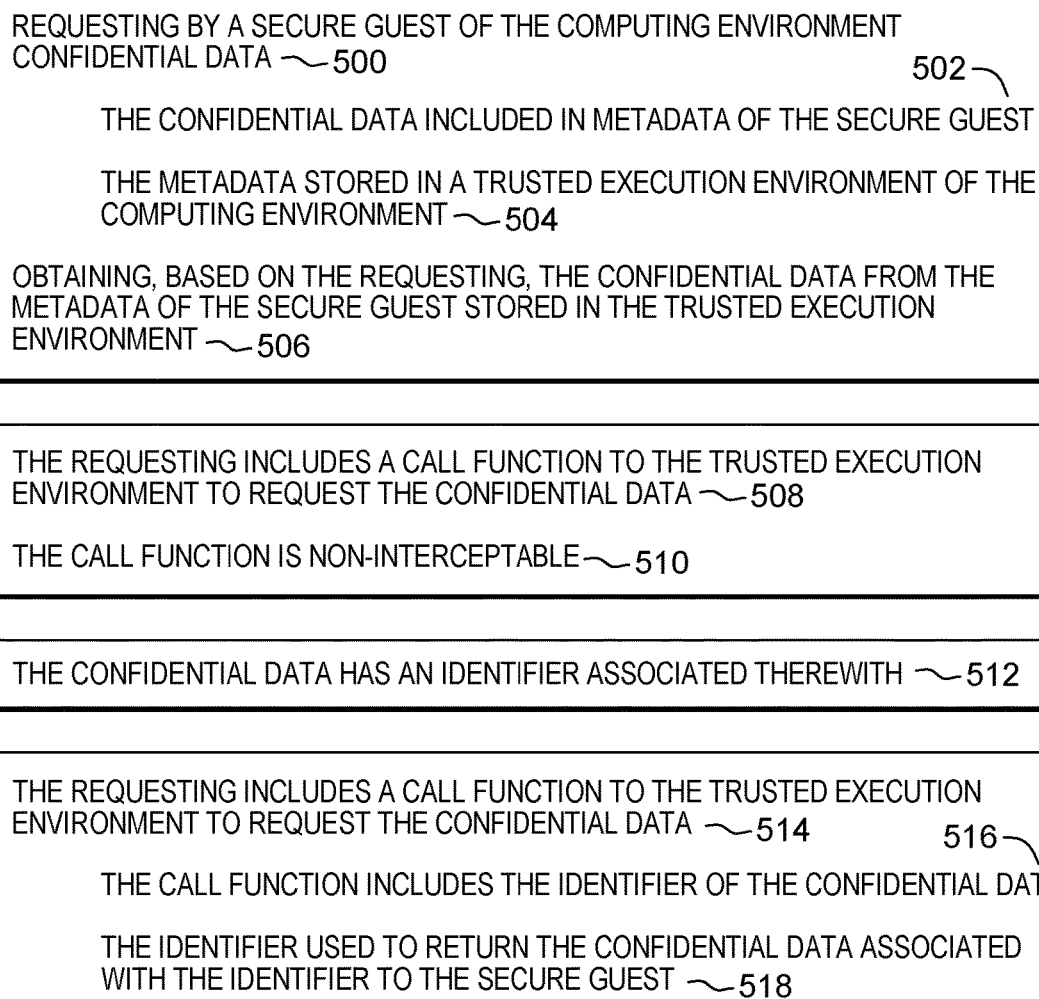

Referring to FIG. 5A, in one embodiment, a secure guest of the computing environment requests confidential data 500. The confidential data is included, for instance, in metadata of the secure guest 502. The metadata is stored, as an example, in a trusted execution environment of the computing environment 504. Based on the requesting, the confidential data is obtained from the metadata of the secure guest stored in the trusted execution environment 506. This provides to the secure guest the confidential data in an efficient manner, improving system performance.

In one example, the requesting includes a call function to the trusted execution environment to request the confidential data 508. As an example, the call function is non-interceptable 510.

In one aspect, the confidential data has an identifier associated therewith 512.

As an example, the requesting includes a call function to the trusted execution environment to request the confidential data 514, and the call function includes the identifier of the confidential data 516. The identifier is used to return the confidential data associated with the identifier to the secure guest 518. The use of the identifier facilitates the providing of the confidential data associated with the identifier, allowing to select specific items and types of confidential data and ensuring protection.

In one example, referring to FIG. 5B, the confidential data includes a key to be used in cryptographic operations 520. In one example, based on the requesting and based on an indication that a plain text value of the key is not to be provided to the secure guest, a protected key object derived from the key is obtained by the secure guest 522. The protected key object is restricted for use by a calling instance of the secure guest and absent the plain text value of the key 524.

The trusted execution environment can convert the key into a protected key object that does not include the plain text value of the key and is enabled for use in the computing environment by the calling instance of the secure guest only. If the secure guest requests a confidential datum of type key from the trusted execution environment, the trusted execution environment returns a protected key object that can be used by the secure guest in cryptographic operations of the computing environment. This allows the secure guest to obtain and use a key of which the plain text value is not disclosed outside of the trusted firmware of the computing environment.

In one example, the indication is included in a data structure accessible to the trusted execution environment configured to provide the confidential data to the secure guest 526.

The confidential data is used by the secure guest, in one example, to establish a secure communication with an entity external to the computing environment 528. This facilitates communication, improving processing associated therewith.

As an example, the metadata is integrity protected having one or more integrity measures for an image of the secure guest and includes the confidential data in an encrypted portion of the metadata that is exclusively decrypted by the trusted execution environment 530. This protects the confidential data in that, in one embodiment, only the trusted execution environment can decrypt the metadata.

Other variations and embodiments are possible.

Figure 6A:
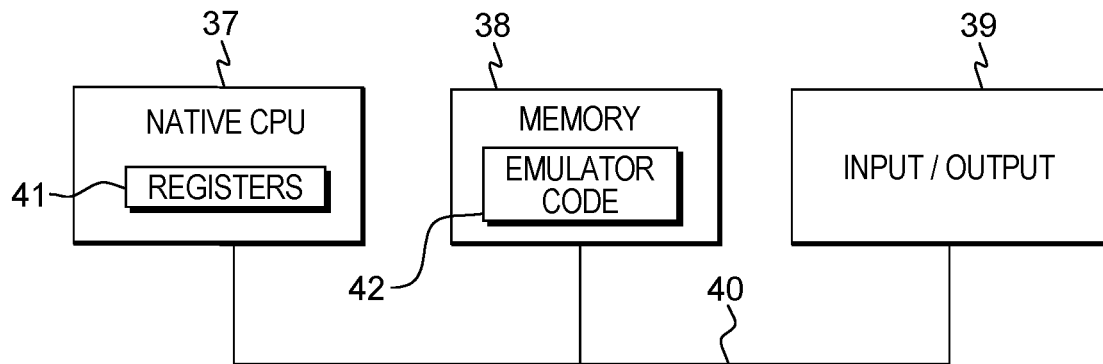
FIG. 6A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 6A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 6B:
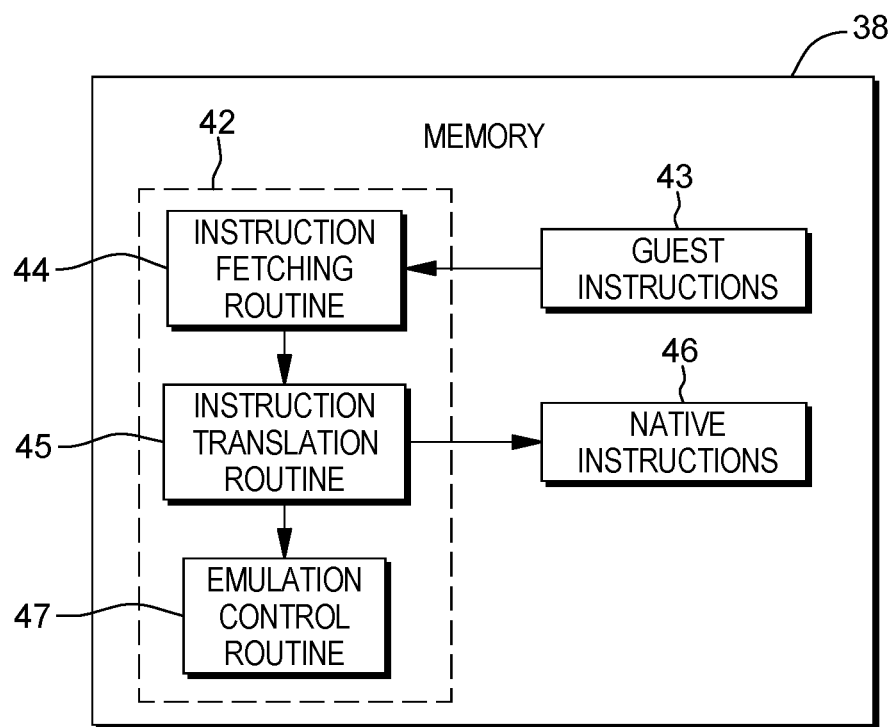
FIG. 6B depicts further details of the memory of FIG. 6A, in accordance with one or more aspects of the present invention.

Further details relating to emulator code 42 are described with reference to FIG. 6B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction, command or call that may be emulated includes the trusted execution environment call described herein, in accordance with one or more aspects of the present invention. Further, other instructions, commands, functions, operations, calls and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
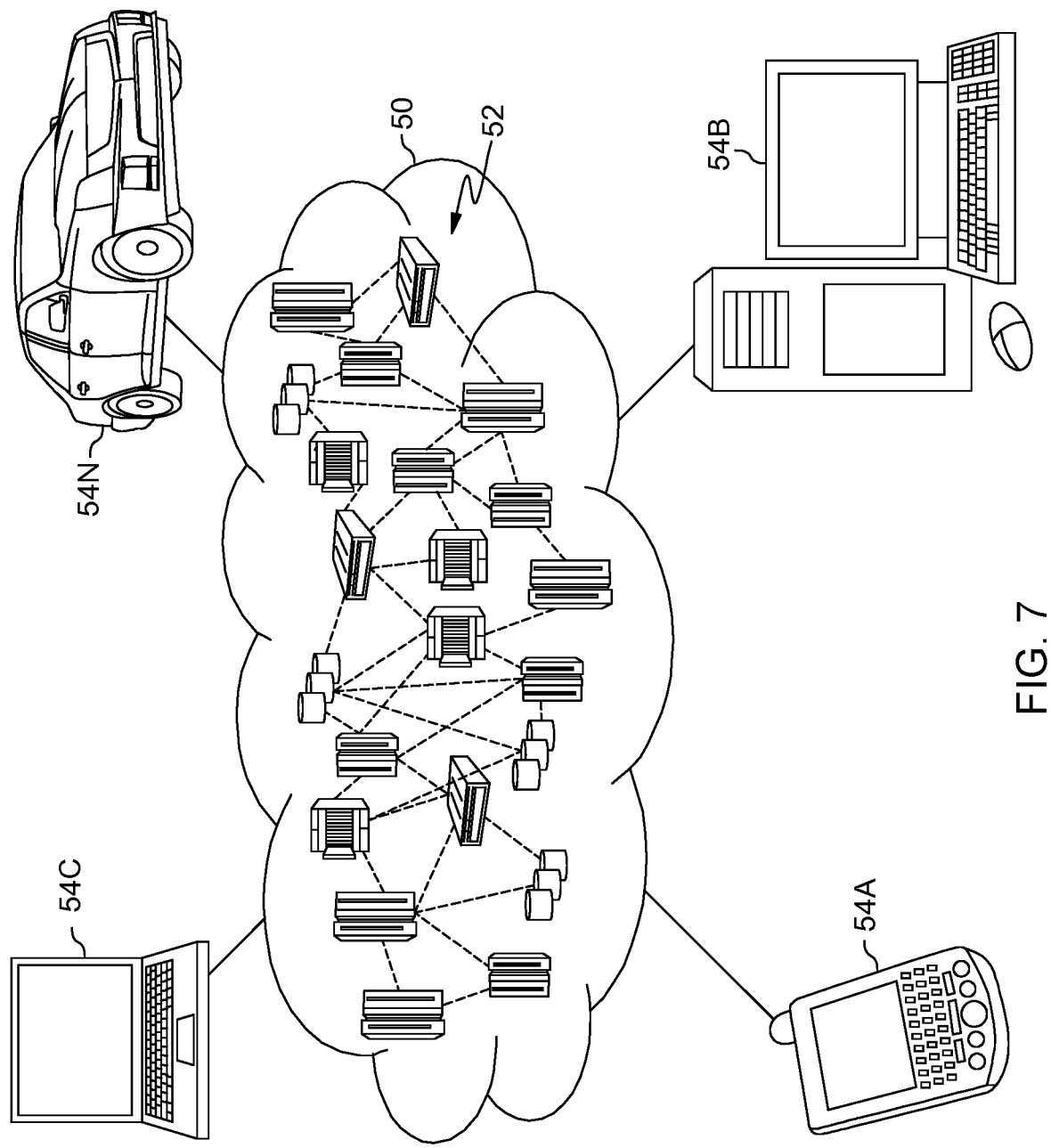
FIG. 7 depicts one embodiment of a cloud computing environment, in accordance with one or more aspects of the present invention.

Referring now to FIG. 7, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 52 and cloud computing environment 50 can communicate with any type of computerized device over any type of network and/or network addressable connection (e.g., using a web browser).

Figure 8:
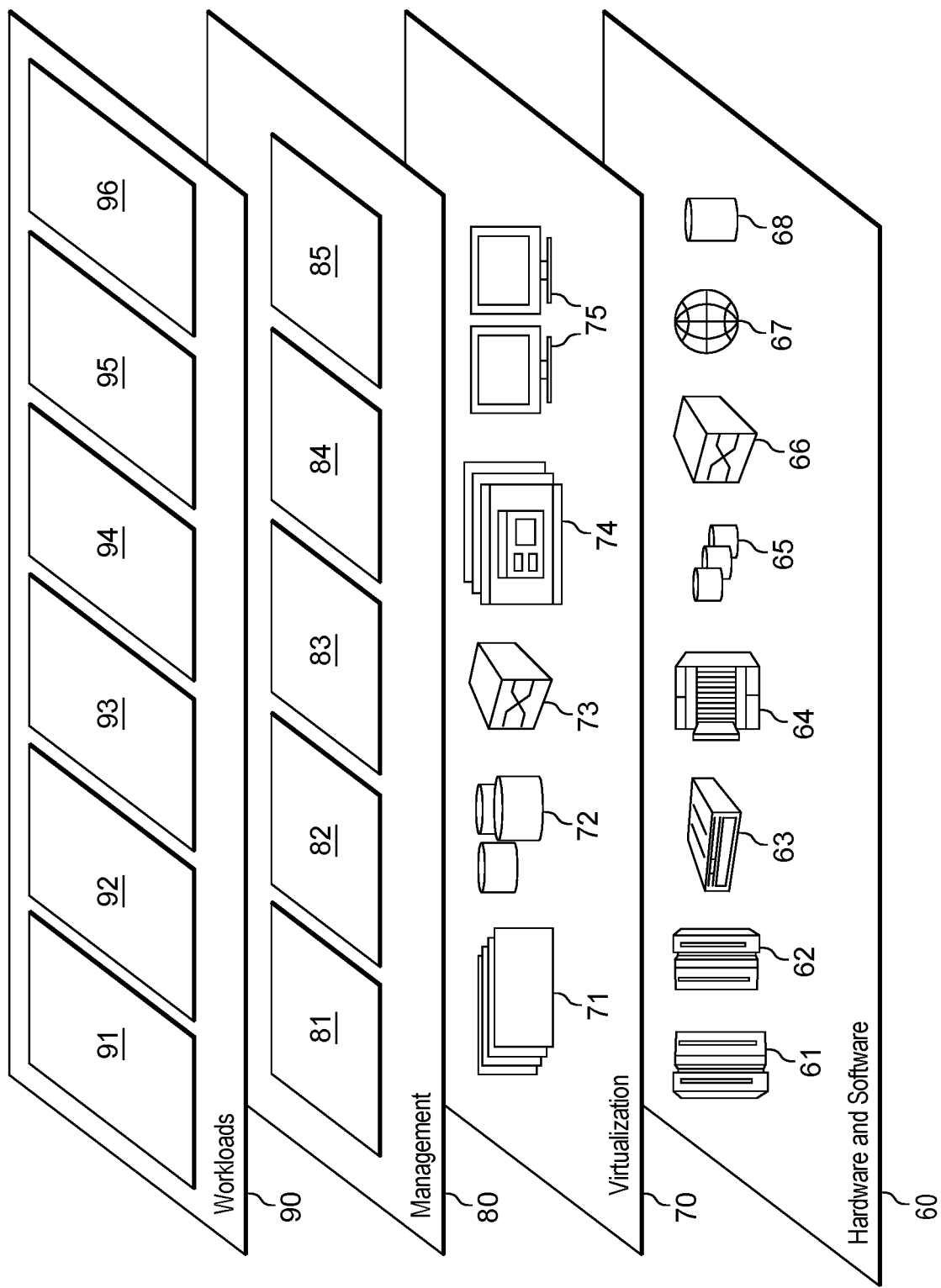
FIG. 8 depicts one example of abstraction model layers, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and provision of confidential data processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, commands, functions, calls and/or operations may be used. Additionally, different types of structures may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer readable storage media and program instructions collectively stored on the one or more computer readable storage media to perform a method comprising:
        requesting by a secure guest of the computing environment confidential data, the confidential data included in metadata of the secure guest, the metadata stored in a trusted execution environment of the computing environment and to be used by the trusted execution environment to perform one or more integrity checks to enforce integrity of a secure guest image used to start the secure guest; and
        obtaining, based on the requesting, the confidential data from the metadata of the secure guest stored in the trusted execution environment.

2. The computer program product of claim 1, wherein the requesting includes a call function to the trusted execution environment to request the confidential data.

3. The computer program product of claim 2, wherein the call function is non-interceptable and directly targeted to the trusted execution environment.

4. The computer program product of claim 1, wherein the confidential data is included in a metadata data structure used by the trusted execution environment, the metadata data structure further including an indicator that indicates a particular representation of the confidential data to be presented to the secure guest, the particular representation selected from a group consisting of a plain text representation and a non-plain text representation.

5. The computer program product of claim 1, wherein the requesting includes a call function to the trusted execution environment to request the confidential data, the call function including an identifier of the confidential data, the identifier used to return the confidential data associated with the identifier to the secure guest.

6. The computer program product of claim 1, wherein the confidential data includes a key to be used in cryptographic operations.

7. The computer program product of claim 6, wherein based on the requesting and based on an indication that a plain text value of the key is not to be provided to the secure guest, a protected key object derived from the key is obtained by the secure guest, the protected key object restricted for use by a calling instance of the secure guest and absent the plain text value of the key.

8. The computer program product of claim 7, wherein the indication is included in a data structure accessible to the trusted execution environment configured to provide the confidential data to the secure guest.

9. The computer program product of claim 1, wherein the method further comprises using the confidential data by the secure guest to establish a secure communication with an entity external to the computing environment.

10. The computer program product of claim 1, wherein the metadata is integrity protected having one or more integrity measures for the secure guest image and includes the confidential data in an encrypted portion of the metadata that is exclusively decrypted by the trusted execution environment.

11. A computer system for facilitating processing within a computing environment, the computer system comprising:
a memory; and
at least one processor in communication with the memory, wherein the computer system is configured to perform a method, said method comprising:
requesting by a secure guest of the computing environment confidential data, the confidential data included in metadata of the secure guest, the metadata stored in a trusted execution environment of the computing environment and to be used by the trusted execution environment to perform one or more integrity checks to enforce integrity of a secure guest image used to start the secure guest; and
obtaining, based on the requesting, the confidential data from the metadata of the secure guest stored in the trusted execution environment.

12. The computer system of claim 11, wherein the confidential data is included in a metadata data structure used by the trusted execution environment, the metadata data structure further including an indicator that indicates a particular representation of the confidential data to be presented to the secure guest, the particular representation selected from a group consisting of a plain text representation and a non-plain text representation.

13. The computer system of claim 11, wherein the requesting includes a call function to the trusted execution environment to request the confidential data, the call function including an identifier of the confidential data, the identifier used to return the confidential data associated with the identifier to the secure guest.

14. The computer system of claim 11, wherein the method further comprises using the confidential data by the secure guest to establish a secure communication with an entity external to the computing environment.

15. The computer system of claim 11, wherein the metadata is integrity protected having one or more integrity measures for the secure guest image and includes the confidential data in an encrypted portion of the metadata that is exclusively decrypted by the trusted execution environment.

16. A computer-implemented method of facilitating processing within a computing environment, the computer-implemented method comprising:
requesting by a secure guest of the computing environment confidential data, the confidential data included in metadata of the secure guest, the metadata stored in a trusted execution environment of the computing environment and to be used by the trusted execution environment to perform one or more integrity checks to enforce integrity of a secure guest image used to start the secure guest; and
obtaining, based on the requesting, the confidential data from the metadata of the secure guest stored in the trusted execution environment.

17. The computer-implemented method of claim 16, wherein the confidential data is included in a metadata data structure used by the trusted execution environment, the metadata data structure further including an indicator that indicates a particular representation of the confidential data to be presented to the secure guest, the particular representation selected from a group consisting of a plain text representation and a non-plain text representation.

18. The computer-implemented method of claim 16, wherein the requesting includes a call function to the trusted execution environment to request the confidential data, the call function including an identifier of the confidential data, the identifier used to return the confidential data associated with the identifier to the secure guest.

19. The computer-implemented method of claim 16, further comprising using the confidential data by the secure guest to establish a secure communication with an entity external to the computing environment.

20. The computer-implemented method of claim 16, wherein the metadata is integrity protected having one or more integrity measures for the secure guest image and includes the confidential data in an encrypted portion of the metadata that is exclusively decrypted by the trusted execution environment.

21. A computer program product for facilitating processing within a computing environment, the computer program product comprising:
one or more computer readable storage media and program instructions collectively stored on the one or more computer readable storage media to perform a method comprising:
obtaining, by a trusted execution environment of the computing environment from a secure guest of the computing environment, a request for confidential data included in metadata of the secure guest, the metadata stored in the trusted execution environment;
determining, by the trusted execution environment based on obtaining the request, a particular representation of the confidential data of the metadata to be provided to the secure guest, the determining using a metadata data structure that includes at least one entry, the at least one entry including an indication of the confidential data and an indicator that indicates the particular representation, the particular representation selected from a plurality of representations; and
providing, by the trusted execution environment based on the determining, the confidential data to the secure guest in the particular representation.

22. The computer program product of claim 21, wherein the confidential data includes a key and the particular representation includes a non-plain text representation, and the providing the confidential data to the secure guest in the non-plain text representation includes deriving a protected key object from the key and providing the protected key object to the secure guest.

23. The computer program product of claim 21, wherein the obtaining the request for the confidential data includes receiving the request via a non-interceptable call from the secure guest directly targeted to the trusted execution environment.

24. The computer program product of claim 21, wherein the indication of the confidential data includes at least one of the confidential data and an identifier of the confidential data.

25. A computer-implemented method for facilitating processing within a computing environment, the computer-implemented method comprising:

obtaining, by a trusted execution environment of the computing environment from a secure guest of the computing environment, a request for confidential data included in metadata of the secure guest, the metadata stored in the trusted execution environment;

determining, by the trusted execution environment based on obtaining the request, a particular representation of the confidential data of the metadata —to be provided to the secure guest, the determining using a metadata data structure that includes at least one entry, the at least one entry including an indication of the confidential data and an indicator that indicates the particular representation, the particular representation selected from a plurality of representation; and providing, by the trusted execution environment based on the determining, the confidential data to the secure guest in the particular representation.

* * * * *